(12) United States Patent
Sakakibara et al.

(10) Patent No.: US 10,831,117 B2
(45) Date of Patent: Nov. 10, 2020

(54) ELECTROPHOTOGRAPHIC PHOTOSENSITIVE MEMBER, ELECTROPHOTOGRAPHIC APPARATUS, AND PROCESS CARTRIDGE

(71) Applicant: CANON KABUSHIKI KAISHA, Tokyo (JP)

(72) Inventors: Akira Sakakibara, Susono (JP); Yota Ito, Mishima (JP); Jumpei Kuno, Yokohama (JP); Shuhei Iwasaki, Yokohama (JP); Kohei Makisumi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/686,645

(22) Filed: Nov. 18, 2019

(65) Prior Publication Data

US 2020/0174385 A1    Jun. 4, 2020

(30) Foreign Application Priority Data

Nov. 29, 2018  (JP) .................................. 2018-224140

(51) Int. Cl.
*G03G 5/14* (2006.01)

(52) U.S. Cl.
CPC ... *G03G 5/144* (2013.01); *G03G 2215/00957* (2013.01)

(58) Field of Classification Search
CPC .................................................... G03G 5/144
See application file for complete search history.

(56) References Cited

U.S. PATENT DOCUMENTS

| | | | |
|---|---|---|---|
| 5,863,685 A * | 1/1999 | DeFeo | G03G 5/0525 430/132 |
| 6,099,996 A * | 8/2000 | Yanus | G03G 5/047 430/133 |
| 6,214,506 B1 | 4/2001 | Kurihara et al. | |
| 9,029,054 B2 | 5/2015 | Okuda et al. | |
| 9,063,505 B2 | 6/2015 | Sekiya et al. | |
| 9,069,267 B2 | 6/2015 | Kaku et al. | |
| 9,523,929 B2 | 12/2016 | Nakamura et al. | |
| 9,535,346 B2 | 1/2017 | Sekiya et al. | |
| 9,563,139 B2 | 2/2017 | Kawahara et al. | |
| 9,645,516 B2 | 5/2017 | Kawahara et al. | |
| 9,772,569 B2 | 9/2017 | Tanaka et al. | |
| 9,851,646 B2 | 12/2017 | Tomono et al. | |
| 9,869,032 B2 | 1/2018 | Kawahara et al. | |
| 10,162,278 B2 | 12/2018 | Kuno et al. | |
| 10,203,617 B2 | 2/2019 | Kuno et al. | |
| 10,303,085 B2 | 5/2019 | Sato et al. | |
| 10,416,581 B2 | 9/2019 | Ito et al. | |
| 10,452,021 B2 | 10/2019 | Miura et al. | |
| 10,545,453 B2 | 1/2020 | Iwasaki et al. | |
| 2014/0030644 A1 * | 1/2014 | Hasegawa | G03G 5/14769 430/56 |
| 2015/0185630 A1 | 7/2015 | Ito et al. | |
| 2015/0185634 A1 | 7/2015 | Sekiya et al. | |
| 2015/0277247 A1 | 10/2015 | Sekiya et al. | |
| 2015/0346617 A1 | 12/2015 | Kawahara et al. | |
| 2015/0362847 A1 | 12/2015 | Tanaka et al. | |
| 2018/0246441 A1 * | 8/2018 | Anezaki | G03G 5/144 |
| 2019/0163119 A1 | 5/2019 | Yamaai et al. | |
| 2019/0243260 A1 * | 8/2019 | Ito | G03G 5/142 |

FOREIGN PATENT DOCUMENTS

| | | | |
|---|---|---|---|
| EP | 2259142 A1 * | 12/2010 | ............ G03G 5/142 |
| JP | H06-273962 | 9/1994 | |
| JP | H08-328283 | 12/1996 | |
| JP | 2000-103620 | 4/2000 | |
| JP | 2000-221719 | 8/2000 | |
| JP | 2002040693 A * | 2/2002 | |
| JP | 2005-292821 | 10/2005 | |

OTHER PUBLICATIONS

English language machine translation of JP 2002-040693 (Year: 2002).*
U.S. Appl. No. 16/668,896, Yota Ito, filed Oct. 30, 2019.

* cited by examiner

*Primary Examiner* — Christopher D RoDee
(74) *Attorney, Agent, or Firm* — Venable LLP

(57) ABSTRACT

Provided is an electrophotographic photosensitive member that is improved in potential stability in long-term use under a high-temperature and high-humidity environment, and does not cause degradation in image quality, such as a low density. The electrophotographic photosensitive member includes: a support; an undercoat layer formed on the support; a charge-generating layer formed directly on the undercoat layer; and a charge-transporting layer formed on the charge-generating layer. The undercoat layer contains a polyamide resin, titanium oxide particles surface-treated with an organic silicon compound, and a compound represented by the following Formula (1), and has a content of the compound represented by the Formula (1) of 4 ppm or more and 80 ppm or less:

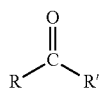

Formula (1)

in the Formula (1), R and R' each independently represent a methyl group or an ethyl group.

8 Claims, 1 Drawing Sheet

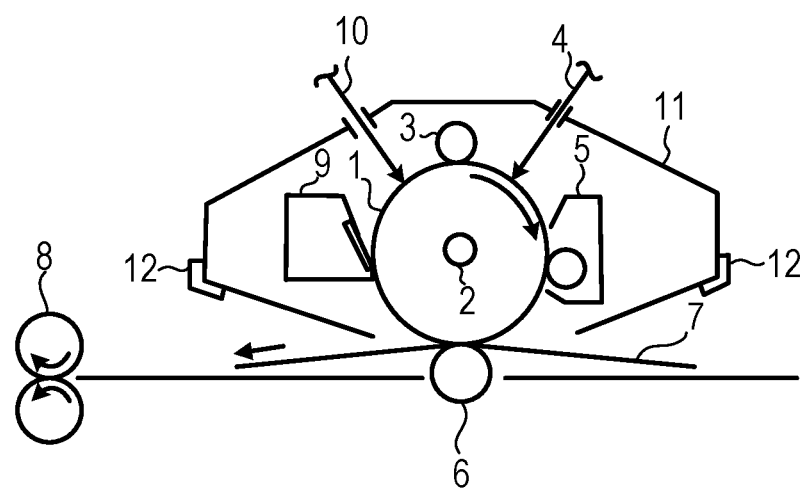

ELECTROPHOTOGRAPHIC PHOTOSENSITIVE MEMBER, ELECTROPHOTOGRAPHIC APPARATUS, AND PROCESS CARTRIDGE

BACKGROUND OF THE INVENTION

Field of the Invention

The present disclosure relates to an electrophotographic photosensitive member, and an electrophotographic apparatus and a process cartridge which include the electrophotographic photosensitive member of the present disclosure.

Description of the Related Art

In an electrophotographic process, in recent years, there is an increasing demand for a higher speed and higher image quality of a recording apparatus. In this situation, there has been a demand for potential stability of an electrophotographic photosensitive member. In view of the foregoing, there is used a procedure involving stabilizing a potential in long-term use by dispersing a conductive agent of titanium oxide in an undercoat layer of a polyamide resin. In this case, there has been known a phenomenon in which moisture in the atmosphere adsorbs to the surface of the conductive agent of titanium oxide to change a resistance, with the result that it becomes difficult to obtain the stability of a potential. In contrast, there has been known a method involving preventing adsorption of moisture by subjecting the surface of the conductive agent to a hydrophobic treatment, to thereby obtain sufficient potential stability (Japanese Patent Application Laid-Open No. 2005-292821 and Japanese Patent Application Laid-Open No. 2000-103620).

SUMMARY OF THE INVENTION

The above-mentioned objects are achieved by the following present disclosure. That is, according to one aspect of the present disclosure, there is provided an electrophotographic photosensitive member including: a support; an undercoat layer formed on the support; a charge-generating layer formed directly on the undercoat layer; and a charge-transporting layer formed on the charge-generating layer, wherein the undercoat layer contains a polyamide resin, titanium oxide particles surface-treated with an organic silicon compound, and a compound represented by the following Formula (1), and wherein the undercoat layer has a content of the compound represented by the Formula (1) of 4 ppm or more and 80 ppm or less:

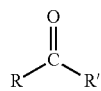

Formula (1)

in the Formula (1), R and R' each independently represent a methyl group or an ethyl group.

In addition, according to one aspect of the present disclosure, there is provided an electrophotographic apparatus including: the above-mentioned electrophotographic photosensitive member; a charging unit; an exposing unit; a developing unit; and a transferring unit.

Further, according to one aspect of the present disclosure, there is provided a process cartridge including: the above-mentioned electrophotographic photosensitive member; and at least one unit selected from the group consisting of a charging unit, a developing unit, and a cleaning unit, the process cartridge integrally supporting the electrophotographic photosensitive member and the at least one unit, and being removably mounted to a main body of an electrophotographic apparatus.

Further features of the present invention will become apparent from the following description of exemplary embodiments with reference to the attached drawings.

BRIEF DESCRIPTION OF THE DRAWINGS

FIGURE is a view for illustrating an example of a schematic configuration of an electrophotographic image-forming apparatus including a process cartridge including an electrophotographic photosensitive member according to one aspect of the present disclosure.

DESCRIPTION OF THE EMBODIMENTS

However, according to the investigations made by the inventors, when the electrophotographic photosensitive members described in Japanese Patent Application Laid-Open No. 2005-292821 and Japanese Patent Application Laid-Open No. 2000-103620 are used, the potential stability under a normal-temperature and normal-humidity environment is improved, but the potential stability under a high-temperature and high-humidity environment is not sufficient. Thus, the above-mentioned electrophotographic photosensitive members do not satisfy the demand for potential stability in long-term use.

Thus, an object of the present disclosure is to provide an electrophotographic photosensitive member that is improved in potential stability in long-term use under a high-temperature and high-humidity environment, and that does not cause degradation in image quality, such as a low density.

The present disclosure is described in detail below by way of preferred aspects. An electrophotographic photosensitive member according to one aspect of the present disclosure includes: a support; an undercoat layer formed on the support; a charge-generating layer formed directly on the undercoat layer; and a charge-transporting layer formed on the charge-generating layer. The undercoat layer contains a polyamide resin, titanium oxide particles surface-treated with an organic silicon compound, and a compound represented by the following Formula (1), and has a content of the compound represented by the Formula (1) of 4 ppm or more and 80 ppm or less:

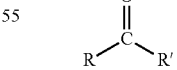

Formula (1)

in the Formula (1), R and R' each independently represent a methyl group or an ethyl group.

The inventors have made investigations, and have clarified that, in order to obtain an electrophotographic photosensitive member having high potential stability in long-term use, it is effective to disperse titanium oxide particles surface-treated with an organic silicon compound in an undercoat layer. However, this method is not sufficient when long-term use under a high-temperature and high-humidity environment is assumed. An untreated hydroxy group remains, although the amount thereof is small, on each surface of the titanium oxide particles surface-treated with the organic silicon compound in the undercoat layer. Therefore, although fluctuation in potential does not cause a problem under a normal-temperature and normal-humidity environment, moisture permeates an inside of the electrophotographic photosensitive member in long-term use under an environment containing a large amount of moisture in the atmosphere, such as a high-temperature and high-humidity environment, and moisture gradually adsorbs to the untreated hydroxy group on each surface of the titanium oxide particles. As a result, it is assumed that the resistance on the surfaces of the titanium oxide particles in the undercoat layer is changed, and transfer of charge in a latent image step during an electrophotographic image-forming process is inhibited, with the result that the stability of a potential on the surface of the electrophotographic photosensitive member is inhibited.

In view of the foregoing, as an approach to preventing moisture in the atmosphere from adsorbing to the untreated hydroxy group on each surface of the titanium oxide particles, the inventors have focused on the introduction of the compound represented by the Formula (1) into the undercoat layer of the electrophotographic photosensitive member. Then, the inventors have found that, when the content of the compound represented by the Formula (1) in the undercoat layer is 4 ppm or more and 80 ppm or less, the electrophotographic photosensitive member obtains potential stability for a long period of time also under a high-temperature and high-humidity environment, and does not cause degradation in image quality, such as a low density. Regarding the foregoing, the inventors have assumed as described below.

In a carbonyl group (C=O) in the compound represented by the Formula (1), the electronegativity of an oxygen atom (O) is higher than that of a carbon atom (C). Therefore, O attracts a shared electron pair with C, and positive (+) charge is biased to C. Meanwhile, the untreated hydroxy group on each surface of the titanium oxide particles described above is biased to negative (−) charge due to the similar phenomenon. As a result, it is assumed that, when the compound represented by the Formula (1) and the titanium oxide particles each having the untreated hydroxy group come close to each other in the undercoat layer, electrical interaction easily occurs. The concept of the present disclosure is to inhibit adsorption of moisture to each surface of the titanium oxide particles through use of this phenomenon.

The inventors have considered the following. It is assumed that, when the above-mentioned situation is created, the compound represented by the Formula (1) apparently covers each surface of the titanium oxide particles. In this case, when moisture in the atmosphere comes close to each surface of the titanium oxide particles, the carbonyl group of the compound represented by the Formula (1) interacts with the untreated hydroxy group. Therefore, the adsorption of moisture to the titanium oxide particles can be inhibited, and a change in resistance on each surface of the titanium oxide particles can be suppressed.

Meanwhile, based on the above-mentioned concept, the compound represented by the Formula (1) itself should not cause a change in resistance on each surface of the titanium oxide particles, and hence it is required to sufficiently investigate the structure and content of the compound represented by the Formula (1).

From the results of the investigations made by the inventors, it has been found that it is important that R and R' of the compound represented by the Formula (1) each independently represent a methyl group or an ethyl group, and the content of the compound represented by the Formula (1) in the undercoat layer be 4 ppm or more and 80 ppm or less. The inventors have presumed the reasons for the foregoing as described below.

The methyl group and the ethyl group each have a short carbon chain length, and hence the bulk of the compound represented by the Formula (1) is small. Therefore, it is considered that the compound represented by the Formula (1) is less liable to cause steric hindrance to each surface of the titanium oxide particles, and easily interacts with the untreated hydroxy groups on the titanium oxide particles.

Meanwhile, when the content of the compound represented by the Formula (1) in the undercoat layer is 4 ppm or more, the interaction between the compound represented by the Formula (1) and the untreated hydroxy groups on the titanium oxide particles becomes sufficient, and hence potential stability for a long period of time under a high-temperature and high-humidity environment can be achieved. In addition, when the content of the compound represented by the Formula (1) in the undercoat layer is 80 ppm or less, the transfer of charge in a latent image step is not inhibited by the compound represented by the Formula (1) itself, and hence potential stability is obtained.

In addition, it has been found that, in the case where the average primary particle diameter of the titanium oxide particles surface-treated with the organic silicon compound is represented by "a" [µm], and the mass ratio of Si elements to Ti elements in the titanium oxide particles surface-treated with the organic silicon compound is represented by "b" [wt %], when the following Expression (a) is satisfied, the interaction between the compound represented by the Formula (1) and the titanium oxide particles surface-treated with the organic silicon compound in the undercoat layer is exhibited more appropriately, and potential stability in long-term use is obtained.

$$0.010 \leq a \times b \leq 0.040 \qquad \text{Expression (a)}$$

The mass ratio "b" [wt %] of the Si elements to the Ti elements in the titanium oxide particles surface-treated with the organic silicon compound may be determined as described below. The titanium oxide particles surface-treated with the organic silicon compound are analyzed with a wavelength dispersion-type fluorescent X-ray analyzer (XRF) (product name: Axios advanced, manufactured by PANalytical), and it is assumed that all the detected Ti elements are $TiO_2$. From the results of the XRF analysis, a content (mass %) of the Si elements to the Ti elements in the titanium oxide particles surface-treated with the organic silicon compound may be determined in terms of $TiO_2$ through use of software (product name: SpectraEvaluation, version 5.0 L, manufactured by PANalytical).

Further, it is more preferred that the average primary particle diameter "a" [µm] of the titanium oxide particles surface-treated with the organic silicon compound be 0.015 µm or more and 0.070 µm or less, because the titanium oxide particles surface-treated with the organic silicon compound are easily dispersed in the undercoat layer in an appropriate manner, with the result that the interaction between the compound represented by the Formula (1) and the titanium oxide particles surface-treated with the organic silicon compound is easily obtained in the undercoat layer.

In the present disclosure, the organic silicon compound used for surface treatment of the titanium oxide particles may be any compound as long as the effects of the present disclosure are obtained, but is preferably a compound represented by the following Formula (2) or Formula (3):

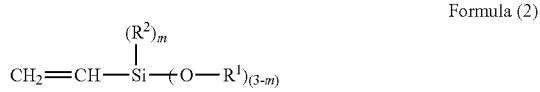

Formula (2)

in the Formula (2), $R^1$ is selected from the group consisting of an alkyl group, an alkylcarbonyl group, and an alkoxyalkyl group, $R^2$ represents a hydrogen atom or an alkyl group, and "m" represents an integer of from 0 to 3.

In the compound represented by the Formula (2), it is preferred that $R^1$ represent a methyl group, an ethyl group, an acetyl group, or a 2-methoxyethyl group, and it is preferred that $R^2$ be not present or represent a hydrogen atom or an alkyl group.

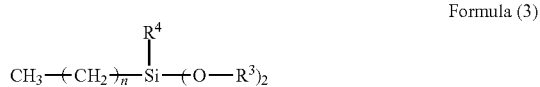

Formula (3)

In the Formula (3), $R^3$ is selected from the group consisting of an alkyl group, an alkylcarbonyl group, and an alkoxyalkyl group, $R^4$ represents a hydrogen atom or an alkoxy group, and "n" represents an integer of from 0 to 7.

In the compound represented by the Formula (3), it is preferred that $R^3$ represent a methyl group, $R^4$ represent a methoxy group, and "n" represent 0, 3, 5, or 7.

It is more preferred that the organic silicon compound used for surface treatment of the titanium oxide particles be at least one kind selected from the group consisting of vinyltrimethoxysilane, vinyltriethoxysilane, and vinylmethyldimethoxysilane, because the interaction between the compound represented by the Formula (1) and the titanium oxide particles surface-treated with the organic silicon compound is easily obtained in the undercoat layer.

[Electrophotographic Photosensitive Member]

The electrophotographic photosensitive member according to one aspect of the present disclosure includes: a support; an undercoat layer formed on the support; a charge-generating layer formed directly on the undercoat layer; and a charge-transporting layer formed on the charge-generating layer. As described below, the expression "a layer formed on an object" encompasses not only the case in which the layer is formed in direct contact with the object, but also the case in which the layer is formed on some another layer formed on the object. Meanwhile, the expression "a layer formed directly on an object" refers to the case in which the layer is formed in direct contact with the object.

A method of producing the electrophotographic photosensitive member according to one aspect of the present disclosure is, for example, a method involving: preparing coating liquids for the respective layers to be described later; applying the liquids in the above-mentioned layer order; and drying the liquids. At this time, as a method of applying each of the coating liquids, there are given, for example, dip coating, spray coating, inkjet coating, roll coating, die coating, blade coating, curtain coating, wire bar coating, and ring coating. Of those, dip coating is preferred from the viewpoints of efficiency and productivity.

Now, each of the layers is described.

<Support>

In one aspect of the present disclosure, the electrophotographic photosensitive member includes a support. In one aspect of the present disclosure, the support is preferably a conductive support having conductivity. In addition, examples of the shape of the support include a cylindrical shape, a belt shape, and a sheet shape. Of those, a cylindrical support is preferred. In addition, the surface of the support may be subjected to, for example, an electrochemical treatment, such as anodization, a blast treatment, or a cutting treatment. A metal, a resin, glass, or the like is preferred as a material for the support.

Examples of the metal include aluminum, iron, nickel, copper, gold, and stainless steel, and alloys thereof. Of those, an aluminum support using aluminum is preferred.

In addition, conductivity may be imparted to the resin or the glass through a treatment involving, for example, mixing or coating the resin or the glass with a conductive material.

<Conductive Layer>

In one aspect of the present disclosure, a conductive layer may be arranged on the support. The arrangement of the conductive layer can conceal flaws and irregularities in the surface of the support, and control the reflection of light on the surface of the support.

The conductive layer preferably contains conductive particles and a resin.

A material for the conductive particles is, for example, a metal oxide, a metal, or carbon black. Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the conductive particles, and in particular, titanium oxide, tin oxide, and zinc oxide are more preferably used.

When the metal oxide is used as the conductive particles, the surface of the metal oxide may be treated with a silane coupling agent or the like, or the metal oxide may be doped with an element, such as phosphorus or aluminum, or an oxide thereof.

In addition, each of the conductive particles may be of a laminated construction having a core particle and a coating layer coating the particle. Examples of the core particle include titanium oxide, barium sulfate, and zinc oxide. The coating layer is, for example, a metal oxide, such as tin oxide.

In addition, when the metal oxide is used as the conductive particles, their volume-average particle diameter is preferably 1 nm or more and 500 nm or less, more preferably 3 nm or more and 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the conductive layer may further contain a concealing agent, such as a silicone oil, resin particles, or titanium oxide.

The average thickness of the conductive layer is preferably 1 μm or more and 50 μm or less, particularly preferably 3 μm or more and 40 μm or less.

The conductive layer may be formed by: preparing a coating liquid for a conductive layer containing the above-mentioned respective materials and a solvent; forming a coat of the coating liquid; and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. As a dispersion method for dispersing the conductive particles in the coating liquid for a conductive layer, there are given methods using a paint shaker, a sand mill, a ball mill, and a liquid collision-type high-speed disperser.

<Undercoat Layer>

In one aspect of the present disclosure, the electrophotographic photosensitive member includes an undercoat layer on the support or the conductive layer. In one aspect of the present disclosure, the undercoat layer contains a polyamide resin, titanium oxide particles surface-treated with an organic silicon compound, and a compound represented by the Formula (1), and the content of the compound represented by the Formula (1) in the undercoat layer is 4 ppm or more and 80 ppm or less. With this, as described above, the potential stability of the electrophotographic photosensitive member according to one aspect of the present disclosure under a high-temperature and high-humidity environment is obtained. In addition, the undercoat layer can improve an adhesive function between layers to impart a charge injection-inhibiting function.

In one aspect of the present disclosure, the undercoat layer contains a polyamide resin. The undercoat layer may further contain, for example, a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide acid resin, a polyimide resin, a polyamide imide resin, or a cellulose resin to the extent that the effects of the present disclosure are not impaired.

In addition, for the purpose of improving electrical characteristics, the undercoat layer may further contain, for example, an electron-transporting substance, a metal oxide, a metal, or a conductive polymer to the extent that the effects described above are not impaired.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, an aryl halide compound, a silole compound, and a boron-containing compound.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The average thickness of the undercoat layer is preferably 0.1 µm or more and 50 µm or less, more preferably 0.2 µm or more and 40 µm or less, particularly preferably 0.3 µm or more and 30 µm or less.

The undercoat layer may be formed by: preparing a coating liquid for an undercoat layer containing the above-mentioned respective materials and a solvent; forming a coat of the coating liquid; and drying and/or curing the coat. Examples of the solvent to be used for the coating liquid include an alcohol-based solvent, a ketone-based solvent, an ether-based solvent, an ester-based solvent, and an aromatic hydrocarbon-based solvent.

<Photosensitive Layer>

The photosensitive layer of the electrophotographic photosensitive member according to one aspect of the present disclosure is a laminated photosensitive layer, and includes a charge-generating layer containing a charge-generating substance and a charge-transporting layer containing a charge-transporting substance.

<Charge-Generating Layer>

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, a titanium phthalocyanine crystal and a gallium phthalocyanine crystal are preferred. An oxytitanium phthalocyanine crystal and a chlorogallium phthalocyanine crystal each having excellent sensitivity are preferably used. Of those, a hydroxy gallium phthalocyanine crystal is more preferred. From the viewpoint of improving sensitivity, an oxytitanium phthalocyanine crystal having a peak at a Bragg angle $2\theta\pm0.3°$ of 27.2° in X-ray diffraction using a CuKα ray, a chlorogallium phthalocyanine crystal having peaks at Bragg angles $2\theta\pm0.3°$ of 7.4°, 16.6°, 25.5°, and 28.3° in X-ray diffraction using a CuKα ray, and a hydroxygallium phthalocyanine crystal having peaks at Bragg angles $2\theta\pm0.3°$ of 7.4° and 28.3° in X-ray diffraction using a CuKα ray are more preferred. In particular, hydroxygallium phthalocyanine has excellent sensitivity improving performance, and hence problems in actual use are less liable to occur even when the transfer of charge is inhibited due to the influence of a change in resistance caused by moisture adsorption to the undercoat layer under a high-temperature and high-humidity environment, and stable potential is easily obtained.

In addition, it is preferred that the gallium phthalocyanine crystal be a gallium phthalocyanine crystal containing an amide compound, such as N,N-dimethylformamide, N-methylformamide, N-propylformamide, or N-vinylformamide, in a crystal.

The content of the amide compound is preferably 0.1 mass % or more and 3.0 mass % or less, more preferably 0.3 mass % or more and 1.9 mass % or less with respect to gallium phthalocyanine in the gallium phthalocyanine crystal. The content of the amide compound may be measured by a $^1$H-NMR method.

The gallium phthalocyanine crystal containing the amide compound in a crystal is obtained in a procedure involving subjecting a solvent, which contains gallium phthalocyanine treated by an acid pasting method or dry milling and the amide compound, by a wet milling treatment, to thereby perform crystal transformation.

The wet milling treatment refers to a treatment performed using a milling device, such as a sand mill or a ball mill, with a disperser, such as glass beads, steel beads, or alumina balls.

As a binder resin, there are given, for example, resins such as polyester, an acrylic resin, polycarbonate, polyvinyl butyral, polystyrene, polyvinyl acetate, polysulfone, an acrylonitrile copolymer, and polyvinyl benzal. Of those, polyvinyl butyral and polyvinyl benzal are preferred as the resin for dispersing the gallium phthalocyanine crystal.

The content of the charge-generating substance in the charge-generating layer is preferably 40 mass % or more and 85 mass % or less, more preferably 60 mass % or more and 80 mass % or less with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The average thickness of the charge-generating layer is preferably 0.1 μm or more and 1 μm or less, more preferably 0.15 μm or more and 0.4 μm or less.

The charge-generating layer may be formed by: preparing a coating liquid for a charge-generating layer containing the above-mentioned respective materials and a solvent; forming a coat of the coating liquid directly on the undercoat layer; and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

<Charge-Transporting Layer>

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from any of those substances. Of those, a triarylamine compound and a benzidine compound are preferred. Of those, a triarylamine compound or a benzidine compound is preferred from the viewpoint of potential stability at the time of repeated use. In addition, a plurality of kinds of charge-transporting substances may be contained in the charge-transporting layer. Specific examples of the charge-transporting substance are described below.

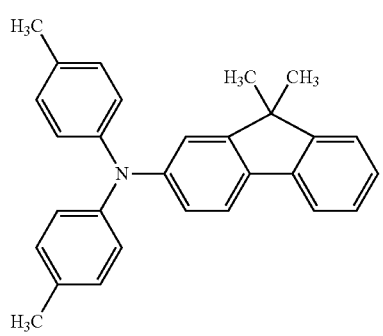

(CTM-1)

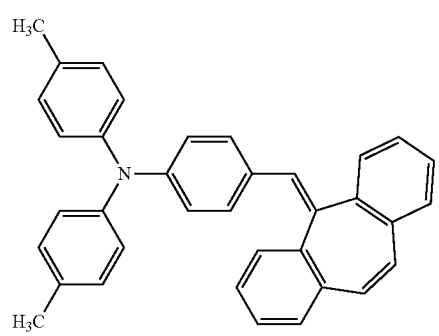

(CTM-2)

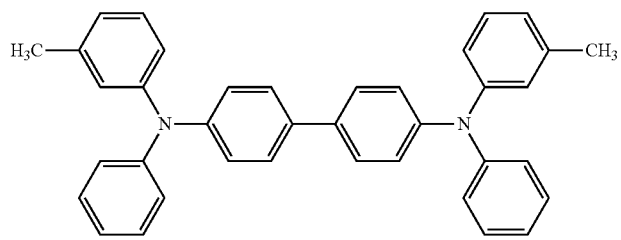

(CTM-3)

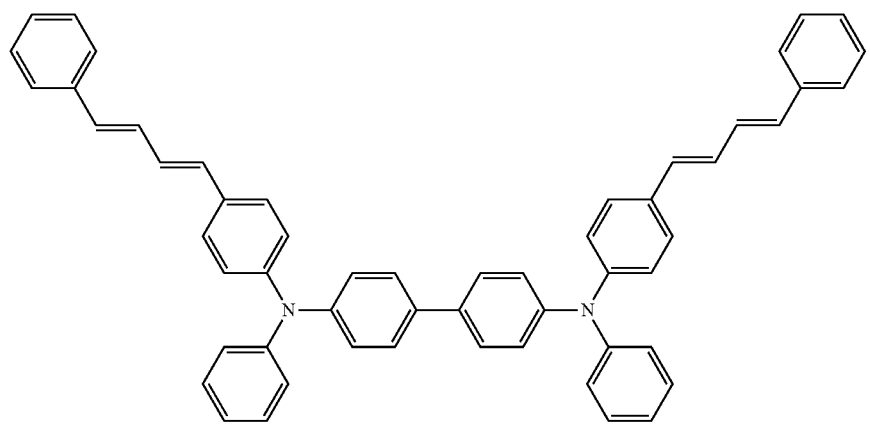

(CTM-4)

(CTM-5)
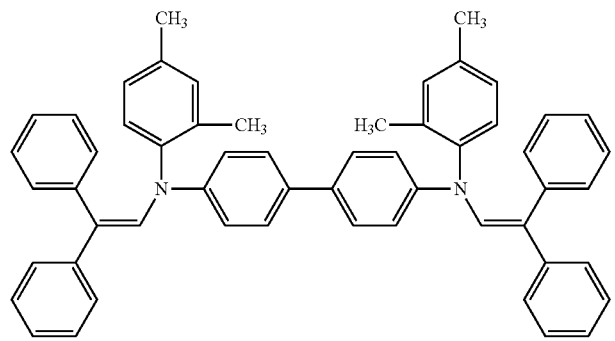
(CTM-6)
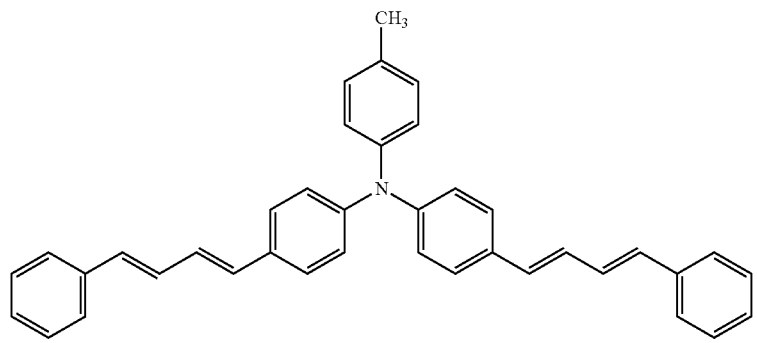
(CTM-7)
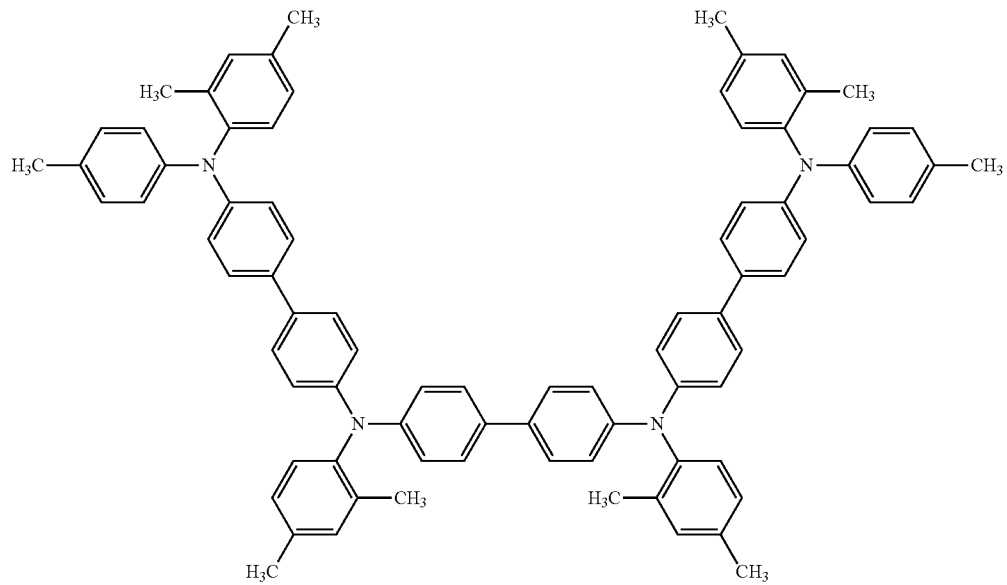
(CTM-8)
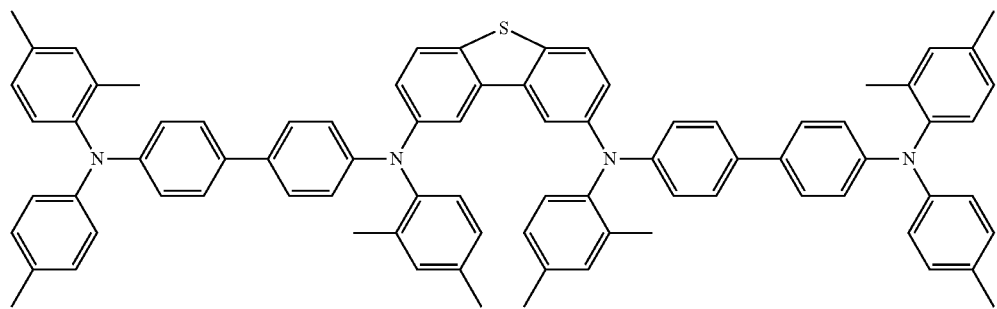

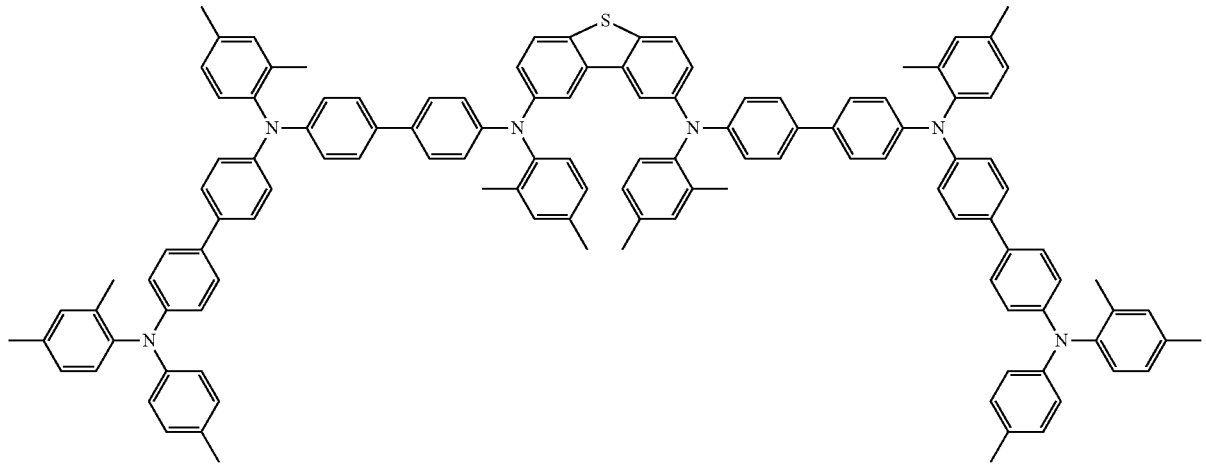

(CTM-9)

The content of the charge-transporting substance in the charge-transporting layer is preferably 20 mass % or more and 60 mass % or less, more preferably 30 mass % or more and 50 mass % or less with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 10:10. The charge-transporting layer may be formed by: forming a coat of a coating liquid for a charge-transporting layer prepared by dissolving the charge-transporting substance and a binder resin in a solvent; and drying the coat.

In addition, the charge-transporting layer may contain an additive, such as an antioxidant, a UV absorber, a plasticizer, a leveling agent, a lubricity-imparting agent, or a wear resistance-improving agent. Specific examples thereof include a hindered phenol compound, a hindered amine compound, a sulfur compound, a phosphorus compound, a benzophenone compound, a siloxane-modified resin, silicone oil, fluororesin particles, polystyrene resin particles, polyethylene resin particles, silica particles, alumina particles, and boron nitride particles.

The average thickness of the charge-transporting layer is preferably 5 μm or more and 50 μm or less, more preferably 8 μm or more and 40 μm or less, particularly preferably 10 μm or more and 30 μm or less.

The charge-transporting layer may be formed by: preparing a coating liquid for a charge-transporting layer containing the above-mentioned respective materials and a solvent; forming a coat of the coating liquid; and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

<Protective Layer>

In the electrophotographic photosensitive member according to one aspect of the present disclosure, a protective layer may be formed on the photosensitive layer within a range in which the effects of the present disclosure are not impaired. When the protective layer is formed, durability can be improved.

The protective layer preferably contains conductive particles and/or a charge-transporting substance, and a resin.

Examples of the conductive particles include particles of metal oxides, such as titanium oxide, zinc oxide, tin oxide, and indium oxide.

Examples of the charge-transporting substance include a polycyclic aromatic compound, a heterocyclic compound, a hydrazone compound, a styryl compound, an enamine compound, a benzidine compound, a triarylamine compound, and a resin having a group derived from any of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protective layer may be formed as a cured film by polymerizing a composition containing a monomer having a polymerizable functional group. As a reaction in this case, there are given, for example, a thermal polymerization reaction, a photopolymerization reaction, and a radiation polymerization reaction. As the polymerizable functional group of the monomer having a polymerizable functional group, there are given, for example, an acryl group and a methacryl group. A material having charge-transporting ability may be used as the monomer having a polymerizable functional group.

The protective layer may contain an additive, such as an antioxidant, a UV absorber, a plasticizer, a leveling agent, a lubricity-imparting agent, or a wear resistance-improving agent. Specific examples thereof include a hindered phenol compound, a hindered amine compound, a sulfur compound, a phosphorus compound, a benzophenone compound, a siloxane-modified resin, silicone oil, fluororesin particles, polystyrene resin particles, polyethylene resin particles, silica particles, alumina particles, and boron nitride particles.

The average thickness of the protective layer is preferably 0.5 μm or more and 10 μm or less, more preferably 1 μm or more and 7 μm or less.

The protective layer may be formed by: preparing a coating liquid for a protective layer containing the above-mentioned respective materials and a solvent; forming a coat of the coating liquid; and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Apparatus]

A process cartridge according to one aspect of the present disclosure integrally supports the electrophotographic photosensitive member described above, and at least one unit selected from the group consisting of a charging unit, a developing unit, and a cleaning unit, and is removably mounted onto the main body of an electrophotographic apparatus.

In addition, an electrophotographic apparatus according to one aspect of the present disclosure includes the electrophotographic photosensitive member described above, a charging unit, an exposing unit, a developing unit, and a transferring unit.

An example of a schematic configuration of the electrophotographic apparatus including a process cartridge 11 including an electrophotographic photosensitive member 1 is illustrated in FIGURE.

The cylindrical electrophotographic photosensitive member 1 is rotationally driven about a shaft 2 in a direction indicated by the arrow at a predetermined peripheral speed. The surface of the electrophotographic photosensitive member 1 is charged to a predetermined positive or negative potential by a charging unit 3. In FIGURE, a roller charging system based on the roller-type charging unit 3 is illustrated, but a charging system such as a corona charging system, a proximity charging system, or an injection charging system may be adopted. The charged surface of the electrophotographic photosensitive member 1 is irradiated with exposure light 4 from an exposing unit (not shown), and hence an electrostatic latent image corresponding to target image information is formed thereon. The electrostatic latent image formed on the surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transferring unit 6. The transfer material 7 onto which the toner image has been transferred is conveyed to a fixing unit 8, is subjected to a treatment for fixing the toner image, and is printed out to the outside of the electrophotographic apparatus. The electrophotographic apparatus may include a cleaning unit 9 for removing a deposit, such as the toner remaining on the surface of the electrophotographic photosensitive member 1 after the transfer. In addition, a so-called cleaner-less system configured to remove the deposit with the developing unit or the like without separate arrangement of the cleaning unit 9 may be used. The electrophotographic apparatus may include an electricity-removing mechanism configured to subject the surface of the electrophotographic photosensitive member 1 to an electricity-removing treatment with pre-exposure light 10 from a pre-exposing unit (not shown). In addition, a guiding unit 12, such as a rail, may be arranged for removably mounting the process cartridge 11 according to one aspect of the present disclosure onto the main body of an electrophotographic apparatus.

The electrophotographic photosensitive member according to one aspect of the present disclosure can be used, for example, in a laser beam printer, an LED printer, a copying machine, a facsimile, and a multifunction peripheral thereof.

EXAMPLES

Now, the present disclosure is described in more detail by way of Examples and Comparative Examples. However, the present disclosure is not limited to these Examples. The term "part(s)" in Examples and Comparative Examples refers to "part(s) by mass".

[Production Example of Coating Liquid for Conductive Layer]

<Coating Liquid (1) for Conductive Layer>

207 Parts of titanium oxide particles (powder resistivity: $2.0 \times 10^3$ Ω·cm, average primary particle diameter: 220 nm) coated with tin oxide doped with phosphorus, 144 parts of a phenol resin (monomer/oligomer of a phenol resin) (product name: Plyophen J-325, manufactured by DIC Corporation, resin solid content: 60 mass %) serving as a binding material, and 98 parts of 1-methoxy-2-propanol serving as a solvent were loaded into a sand mill using 450 parts of glass beads each having a diameter of 0.8 mm, and were subjected to a dispersion treatment under the conditions of a rotation speed of 2,000 rpm, a dispersion treatment time of 4 hours, and a set temperature of cooling water of 18° C., to thereby obtain a dispersion liquid.

The glass beads were removed from the dispersion liquid with a mesh. After that, 13.8 parts of silicone resin particles (product name: Tospal 120, manufactured by GE-Toshiba Silicone Co., Ltd., average particle diameter: 2 μm) serving as a surface roughness-imparting material, 0.014 part of silicone oil (product name: SH28PA, manufactured by Dow Corning Toray Co., Ltd.) serving as a leveling agent, 6 parts of methanol, and 6 parts of 1-methoxy-2-propanol were added to the resultant dispersion liquid, followed by stirring, to thereby prepare a coating liquid (1) for a conductive layer.

<Coating Liquid (2) for Conductive Layer>

100 g of substantially spherical anatase-type titanium dioxide having an average primary particle diameter of 150 nm and a niobium content of 0.20 wt % was dispersed in water to obtain 1 L of a water suspension. The water suspension was heated to 60° C. A titanium niobate solution obtained by mixing: a niobium solution in which 3 g of niobium pentachloride ($NbCl_5$) was dissolved in 100 mL of 11.4 mol/L hydrochloric acid; and 600 mL of a titanium sulfate solution containing 33.7 g of Ti, and a 10.7 mol/L sodium hydroxide solution were simultaneously dropped (added in parallel) to the suspension over 3 hours so that the pH of the suspension reached from 2 to 3. After the dropping was completed, the suspension was filtered and washed, and dried at 110° C. for 8 hours. The resultant dried product was subjected to a heating treatment at 800° C. for 1 hour in an atmospheric atmosphere, to thereby obtain powder of metal oxide particles each including a core material containing titanium oxide and a coating layer containing titanium oxide doped with niobium.

50 Parts of a phenol resin (monomer/oligomer of a phenol resin) (product name: Plyophen J-325, manufactured by DIC Corporation, resin solid content: 60%, density after curing: 1.3 g/cm$^2$) serving as a binding material was dissolved in 35 parts of 1-methoxy-2-propanol serving as a solvent, to thereby obtain a solution. 75 Parts of the metal oxide particles were added to this solution. The resultant was loaded, as a dispersion medium, into a vertical sand mill using 120 parts of glass beads having an average particle diameter of 1.0 mm and subjected to a dispersion treatment for 4 hours under the conditions of a dispersion liquid temperature of 23±3° C. and a rotation speed of 1,500 rpm (peripheral speed: 5.5 m/s), to thereby obtain a dispersion liquid. The glass beads were removed from the dispersion liquid with a mesh. 0.01 Part of silicone oil (product name: SH28 PAINT ADDITIVE, manufactured by Dow Corning Toray Co., Ltd.) serving as a leveling agent and 10 parts of silicone resin particles (product name: Tospal 120, manufactured by Momentive Performance Materials Inc., average particle diameter: 2 μm, density: 1.3 g/cm$^2$) serving as a surface roughness-imparting material were added to the dispersion liquid having the glass beads removed therefrom, followed by stirring. The resultant was filtered under pressure through use of a PTFE filter (product name: PF060, manufactured by Advantec Toyo Kaisha, Ltd.), to thereby prepare a coating liquid (2) for a conductive layer.

[Production Example of Coating Liquid for Undercoat Layer]

<Coating Liquid (1) for Undercoat Layer>

100 Parts of rutile-type titanium oxide particles (average primary particle diameter: 50 nm, manufactured by Tayca Corporation) were mixed with 500 parts of toluene with stirring. 3.0 Parts of vinyltrimethoxysilane (product name: KBM-1003, manufactured by Shin-Etsu Chemical Co., Ltd.), in which m=0 and R$^1$ represents a methyl group, was added to the mixture as a compound represented by the Formula (2), followed by stirring for 8 hours. After that, toluene was distilled away by distillation under reduced pressure, and the resultant was dried at 120° C. for 3 hours, to thereby obtain rutile-type titanium oxide particles surface-treated with vinyltrimethoxysilane.

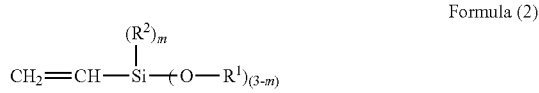

Formula (2)

18 Parts of the rutile-type titanium oxide particles surface-treated with vinyltrimethoxysilane, 4.5 parts of N-methoxymethylated nylon (product name: Toresin EF-30T, manufactured by Nagase ChemteX Corporation), and 1.5 parts of a copolymer nylon resin (product name: Amilan CM8000, manufactured by Toray Industries, Inc.) were added to a mixed solvent of 90 parts of methanol, 60 parts of 1-butanol, and 15 parts of acetone, to thereby prepare a dispersion liquid. The dispersion liquid was subjected to a dispersion treatment for 5 hours with a vertical sand mill using glass beads each having a diameter of 1.0 mm, to thereby prepare a coating liquid (1) for an undercoat layer.

As shown in Table 1, in the undercoat layer, R=CH$_3$ and R'=CH$_3$ in the compound represented by the Formula (1), and a=0.050, b=0.45, and a×b=0.023 in the Expression (a).

<Coating Liquid (2) for Undercoat Layer>

A coating liquid (2) for an undercoat layer was obtained by the same procedure as in the production example of the coating liquid (1) for an undercoat layer except that 14 parts of methyl ethyl ketone was used instead of 15 parts of acetone. The results are shown in Table 1.

<Coating Liquid (3) for Undercoat Layer>

A coating liquid (3) for an undercoat layer was obtained by the same procedure as in the production example of the coating liquid (1) for an undercoat layer except that 13 parts of diethyl ketone was used instead of 15 parts of acetone. The results are shown in Table 1.

<Coating Liquid (4) for Undercoat Layer>

A coating liquid (4) for an undercoat layer was obtained by the same procedure as in the production example of the coating liquid (2) for an undercoat layer except that the amount of methyl ethyl ketone was changed to 4 parts. The results are shown in Table 1.

<Coating Liquid (5) for Undercoat Layer>

A coating liquid (5) for an undercoat layer was obtained by the same procedure as in the production example of the coating liquid (2) for an undercoat layer except that the amount of methyl ethyl ketone was changed to 58 parts. The results are shown in Table 1.

<Coating Liquid (6) for Undercoat Layer>

A coating liquid (6) for an undercoat layer was obtained by the same procedure as in the production example of the coating liquid (2) for an undercoat layer except that the compound represented by the Formula (2) was changed to 1.4 parts of vinyltriethoxysilane (product name: KBE-1003, manufactured by Shin-Etsu Chemical Co., Ltd.) in which m=0 and R$^1$ represents an ethyl group. The results are shown in Table 1.

<Coating Liquid (7) for Undercoat Layer>

A coating liquid (7) for an undercoat layer was obtained by the same procedure as in the production example of the coating liquid (2) for an undercoat layer except that the compound represented by the Formula (2) was changed to 3.2 parts of vinylmethyldimethoxysilane (product name: SILQUEST A-2171 SILANE, manufactured by Momentive Performance Materials Japan LLC) in which m=1, R$^1$ represents a methyl group, and R$^2$ represents a methyl group. The results are shown in Table 1.

<Coating Liquid (8) for Undercoat Layer>

100 Parts of rutile-type titanium oxide particles (average primary particle diameter: 15 nm, manufactured by Tayca Corporation) were mixed with 500 parts of toluene with stirring. 10.0 Parts of vinyltrimethoxysilane (product name: KBM-1003, manufactured by Shin-Etsu Chemical Co., Ltd.), in which m=0 and R$^1$ represents a methyl group, was added to the mixture as a compound represented by the Formula (2), followed by stirring for 8 hours. After that, toluene was distilled away by distillation under reduced pressure, and the resultant was dried at 120° C. for 3 hours, to thereby obtain rutile-type titanium oxide particles surface-treated with vinyltrimethoxysilane.

12 Parts of the rutile-type titanium oxide particles surface-treated with vinyltrimethoxysilane, 9.0 parts of N-methoxymethylated nylon (product name: Toresin EF-30T, manufactured by Nagase ChemteX Corporation), and 3.0 parts of a copolymer nylon resin (product name: Amilan CM8000, manufactured by Toray Industries, Inc.) were added to a mixed solvent of 90 parts of methanol, 60 parts of 1-butanol, and 15 parts of methyl ethyl ketone, to thereby prepare a dispersion liquid.

The dispersion liquid was subjected to a dispersion treatment for 5 hours with a vertical sand mill using glass beads each having a diameter of 1.0 mm, and the glass beads were removed from the dispersion liquid. Thus, a coating liquid (8) for an undercoat layer was prepared. The results are shown in Table 1.

<Coating Liquid (9) for Undercoat Layer>

100 Parts of rutile-type titanium oxide particles (average primary particle diameter: 80 nm, manufactured by Tayca Corporation) were mixed with 500 parts of toluene with stirring. 1.8 Parts of vinyltrimethoxysilane (product name: KBM-1003, manufactured by Shin-Etsu Chemical Co., Ltd.), in which m=0 and R$^1$ represents a methyl group, was added to the mixture as a compound represented by the Formula (2), followed by stirring for 8 hours. After that, toluene was distilled away by distillation under reduced pressure, and the resultant was dried at 120° C. for 3 hours, to thereby obtain rutile-type titanium oxide particles surface-treated with vinyltrimethoxysilane.

19.8 Parts of the rutile-type titanium oxide particles surface-treated with vinyltrimethoxysilane, 3.3 parts of N-methoxymethylated nylon (product name: Toresin EF-30T, manufactured by Nagase ChemteX Corporation), and 1.1 parts of a copolymer nylon resin (product name: Amilan CM8000, manufactured by Toray Industries, Inc.) were added to a mixed solvent of 90 parts of methanol, 60 parts of 1-butanol, and 15 parts of methyl ethyl ketone, to thereby prepare a dispersion liquid.

The dispersion liquid was subjected to a dispersion treatment for 5 hours with a vertical sand mill using glass beads each having a diameter of 1.0 mm, and the glass beads were removed from the dispersion liquid. Thus, a coating liquid (9) for an undercoat layer was prepared. The results are shown in Table 1.

<Coating Liquid (10) for Undercoat Layer>

100 Parts of rutile-type titanium oxide particles (average primary particle diameter: 50 nm, manufactured by Tayca Corporation) were mixed with 400 parts of toluene and 100 parts of methyl ethyl ketone with stirring. 3.0 Parts of vinyltrimethoxysilane (product name: KBM-1003, manufactured by Shin-Etsu Chemical Co., Ltd.), in which m=0 and $R^1$ represents a methyl group, was added to the mixture as a compound represented by the Formula (2), followed by stirring for 8 hours. After that, toluene was distilled away by distillation under reduced pressure, and the resultant was dried at 120° C. for 3 hours, to thereby obtain rutile-type titanium oxide particles surface-treated with vinyltrimethoxysilane.

18 Parts of the rutile-type titanium oxide particles surface-treated with vinyltrimethoxysilane, 4.5 parts of N-methoxymethylated nylon (product name: Toresin EF-30T, manufactured by Nagase ChemteX Corporation), and 1.5 parts of a copolymer nylon resin (product name: Amilan CM8000, manufactured by Toray Industries, Inc.) were added to a mixed solvent of 90 parts of methanol, 60 parts of 1-butanol, and 15 parts of methyl ethyl ketone, to thereby prepare a dispersion liquid. The dispersion liquid was subjected to a dispersion treatment for 5 hours with a vertical sand mill using glass beads each having a diameter of 1.0 mm, to thereby prepare a coating liquid (10) for an undercoat layer. The results are shown in Table 1.

<Coating Liquid (18) for Undercoat Layer>

A coating liquid (18) for an undercoat layer was obtained by the same procedure as in the production example of the coating liquid (2) for an undercoat layer except that the compound represented by the Formula (2) was changed to 3.2 parts of vinyltriacetoxysilane (product name: Z-6075, manufactured by Dow Corning Toray Co., Ltd.) in which m=0 and $R^1$ represents an acetyl group. The results are shown in Table 1.

<Coating Liquid (19) for Undercoat Layer>

A coating liquid (19) for an undercoat layer was obtained by the same procedure as in the production example of the coating liquid (2) for an undercoat layer except that the compound represented by the Formula (2) was changed to 3.2 parts of vinyltris(2-methoxyethoxy)silane (product name: A-172, manufactured by Momentive Performance Materials Japan LLC) in which m=0 and $R^1$ represents a 2-methoxyethyl group. The results are shown in Table 1.

TABLE 1

| Coating liquid for undercoat layer | Compound represented by Formula (1) | | Number of added parts | Compound represented by Formula (2) | | | a [mm] | b [wt %] | a × b |
|---|---|---|---|---|---|---|---|---|---|
| | R | R' | | $R^1$ | $R^2$ | m | | | |
| Coating liquid (1) for undercoat layer | $CH_3$ | $CH_3$ | 15 | $CH_3$ | — | 0 | 0.050 | 0.45 | 0.023 |
| Coating liquid (2) for undercoat layer | $CH_3$ | $CH_3CH_2$ | 14 | $CH_3$ | — | 0 | 0.050 | 0.45 | 0.023 |
| Coating liquid (3) for undercoat layer | $CH_3CH_2$ | $CH_3CH_2$ | 13 | $CH_3$ | — | 0 | 0.050 | 0.45 | 0.023 |
| Coating liquid (4) for undercoat layer | $CH_3$ | $CH_3CH_2$ | 4 | $CH_3$ | — | 0 | 0.050 | 0.45 | 0.023 |
| Coating liquid (5) for undercoat layer | $CH_3$ | $CH_3CH_2$ | 58 | $CH_3$ | — | 0 | 0.050 | 0.45 | 0.023 |
| Coating liquid (6) for undercoat layer | $CH_3$ | $CH_3CH_2$ | 14 | $CH_3CH_2$ | — | 0 | 0.050 | 0.45 | 0.023 |
| Coating liquid (7) for undercoat layer | $CH_3$ | $CH_3CH_2$ | 14 | $CH_3$ | $CH_3$ | 1 | 0.050 | 0.39 | 0.020 |
| Coating liquid (8) for undercoat layer | $CH_3$ | $CH_3CH_2$ | 14 | $CH_3$ | — | 0 | 0.015 | 0.52 | 0.008 |
| Coating liquid (9) for undercoat layer | $CH_3$ | $CH_3CH_2$ | 14 | $CH_3$ | — | 0 | 0.080 | 0.52 | 0.042 |
| Coating liquid (10) for undercoat layer | $CH_3$ | $CH_3CH_2$ | 14 | $CH_3$ | — | 0 | 0.050 | 0.45 | 0.023 |
| Coating liquid (18) for undercoat layer | $CH_3$ | $CH_3CH_2$ | 14 | $COCH_3$ | — | 0 | 0.050 | 0.45 | 0.023 |
| Coating liquid (19) for undercoat layer | $CH_3$ | $CH_3CH_2$ | 14 | $CH_2CH_2OCH_3$ | — | 0 | 0.050 | 0.45 | 0.023 |

<Coating Liquid (11) for Undercoat Layer>

100 Parts of rutile-type titanium oxide particles (average primary particle diameter: 50 nm, manufactured by Tayca Corporation) were mixed with 500 parts of toluene with stirring. 3.0 Parts of methyltrimethoxysilane, in which n=0, $R^3$ represents a methyl group, and $R^4$ represents a methoxy group, was added to the mixture as a compound represented by the Formula (3), followed by stirring for 8 hours. After that, toluene was distilled away by distillation under reduced pressure, and the resultant was dried at 120° C. for 3 hours, to thereby obtain rutile-type titanium oxide particles surface-treated with methyltrimethoxysilane.

18 Parts of the rutile-type titanium oxide particles surface-treated with methyltrimethoxysilane, 4.5 parts of N-methoxymethylated nylon (product name: Toresin EF-30T, manufactured by Nagase ChemteX Corporation), and 1.5 parts of a copolymer nylon resin (product name: Amilan CM8000, manufactured by Toray Industries, Inc.) were added to a mixed solvent of 90 parts of methanol, 60 parts of 1-butanol, and 14 parts of methyl ethyl ketone, to thereby prepare a dispersion liquid. The dispersion liquid was subjected to a dispersion treatment for 5 hours with a vertical sand mill using glass beads each having a diameter of 1.0 mm, to thereby prepare a coating liquid (11) for an undercoat layer. The results are shown in Table 2.

<Coating Liquid (12) for Undercoat Layer>

A coating liquid (12) for an undercoat layer was obtained by the same procedure as in the production example of the coating liquid (11) for an undercoat layer except that the compound represented by the Formula (3) was changed to 3.0 parts of butyltrimethoxysilane in which n=3, $R^3$ represents a methyl group, and $R^4$ represents a methoxy group. The results are shown in Table 2.

<Coating Liquid (13) for Undercoat Layer>

A coating liquid (13) for an undercoat layer was obtained by the same procedure as in the production example of the coating liquid (11) for an undercoat layer except that the compound represented by the Formula (3) was changed to 3.0 parts of hexyltrimethoxysilane in which n=5, $R^3$ represents a methyl group, and $R^4$ represents a methoxy group. The results are shown in Table 2.

<Coating Liquid (14) for Undercoat Layer>

A coating liquid (14) for an undercoat layer was obtained by the same procedure as in the production example of the coating liquid (11) for an undercoat layer except that the compound represented by the Formula (3) was changed to 3.0 parts of octyltrimethoxysilane in which n=7, $R^3$ represents a methyl group, and $R^4$ represents a methoxy group. The results are shown in Table 2.

<Coating Liquid (15) for Undercoat Layer>

100 Parts of rutile-type titanium oxide particles (average primary particle diameter: 50 nm, manufactured by Tayca Corporation) were mixed with 500 parts of toluene with stirring. 3.0 Parts of methyltrimethoxysilane, in which n=0, $R^3$ represents a methyl group, and $R^4$ represents a methoxy group, was added to the mixture as a compound represented by the Formula (3), followed by stirring for 8 hours. After that, toluene was distilled away by distillation under reduced pressure, and the resultant was dried at 120° C. for 3 hours, to thereby obtain rutile-type titanium oxide particles surface-treated with methyltrimethoxysilane.

18 Parts of the rutile-type titanium oxide particles surface-treated with methyltrimethoxysilane, 4.5 parts of N-methoxymethylated nylon (product name: Toresin EF-30T, manufactured by Nagase ChemteX Corporation), and 1.5 parts of a copolymer nylon resin (product name: Amilan CM8000, manufactured by Toray Industries, Inc.) were added to a mixed solvent of 90 parts of methanol, 60 parts of 1-butanol, and 90 parts of methyl ethyl ketone, to thereby prepare a dispersion liquid. The dispersion liquid was subjected to a dispersion treatment for 5 hours with a vertical sand mill using glass beads each having a diameter of 1.0 mm, to thereby prepare a coating liquid (15) for an undercoat layer. The results are shown in Table 2.

<Coating Liquid (16) for Undercoat Layer>

100 Parts of rutile-type titanium oxide particles (average primary particle diameter: 50 nm, manufactured by Tayca Corporation) were mixed with 500 parts of toluene with stirring. 3.0 Parts of methyltrimethoxysilane, in which n=0, $R^3$ represents a methyl group, and $R^4$ represents a methoxy group, was added to the mixture as a compound represented by the Formula (3), followed by stirring for 8 hours. After that, toluene was distilled away by distillation under reduced pressure, and the resultant was dried at 120° C. for 3 hours, to thereby obtain rutile-type titanium oxide particles surface-treated with methyltrimethoxysilane.

18 Parts of the rutile-type titanium oxide particles surface-treated with methyltrimethoxysilane, 4.5 parts of N-methoxymethylated nylon (product name: Toresin EF-30T, manufactured by Nagase ChemteX Corporation), and 1.5 parts of a copolymer nylon resin (product name: Amilan CM8000, manufactured by Toray Industries, Inc.) were added to a mixed solvent of 90 parts of methanol, 60 parts of 1-butanol, and 15 parts of dipropyl ketone, to thereby prepare a dispersion liquid. The dispersion liquid was subjected to a dispersion treatment for 5 hours with a vertical sand mill using glass beads each having a diameter of 1.0 mm, to thereby prepare a coating liquid (16) for an undercoat layer. The results are shown in Table 2.

<Coating Liquid (17) for Undercoat Layer>

100 Parts of rutile-type titanium oxide particles (average primary particle diameter: 50 nm, manufactured by Tayca Corporation) were mixed with 500 parts of toluene with stirring. 3.0 Parts of methyltrimethoxysilane, in which n=0, $R^3$ represents a methyl group, and $R^4$ represents a methoxy group, was added to the mixture as a compound represented by the Formula (3), followed by stirring for 8 hours. After that, toluene was distilled away by distillation under reduced pressure, and the resultant was dried at 120° C. for 3 hours, to thereby obtain rutile-type titanium oxide particles surface-treated with methyltrimethoxysilane.

18 Parts of the rutile-type titanium oxide particles surface-treated with methyltrimethoxysilane, 4.5 parts of N-methoxymethylated nylon (product name: Toresin EF-30T, manufactured by Nagase ChemteX Corporation), and 1.5 parts of a copolymer nylon resin (product name: Amilan CM8000, manufactured by Toray Industries, Inc.) were added to a mixed solvent of 90 parts of methanol and 60 parts of 1-butanol, to thereby prepare a dispersion liquid. The dispersion liquid was subjected to a dispersion treatment for 5 hours with a vertical sand mill using glass beads each having a diameter of 1.0 mm, to thereby prepare a coating liquid (17) for an undercoat layer. The results are shown in Table 2.

TABLE 2

| Coating liquid for undercoat layer | Compound represented by Formula (1) | | Number of added parts | Compound represented by Formula (3) | | | | | a x b |
|---|---|---|---|---|---|---|---|---|---|
| | R | R' | | $R^3$ | $R^4$ | n | a [mm] | b [wt %] | |
| Coating liquid (11) for undercoat layer | $CH_3$ | $CH_3CH_2$ | 14 | $CH_3$ | $OCH_3$ | 0 | 0.050 | 0.21 | 0.011 |
| Coating liquid (12) for undercoat layer | $CH_3$ | $CH_3CH_2$ | 14 | $CH_3$ | $OCH_3$ | 3 | 0.050 | 0.68 | 0.034 |
| Coating liquid (13) for undercoat layer | $CH_3$ | $CH_3CH_2$ | 14 | $CH_3$ | $OCH_3$ | 5 | 0.050 | 0.73 | 0.037 |
| Coating liquid (14) for undercoat layer | $CH_3$ | $CH_3CH_2$ | 14 | $CH_3$ | $OCH_3$ | 7 | 0.050 | 0.81 | 0.041 |
| Coating liquid (15) for undercoat layer | $CH_3$ | $CH_3CH_2$ | 90 | $CH_3$ | $OCH_3$ | 0 | 0.050 | 0.81 | 0.041 |
| Coating liquid (16) for undercoat layer | $CH_3CH_2CH_2$ | $CH_3CH_2CH_2$ | 14 | $CH_3$ | $OCH_3$ | 0 | 0.050 | 0.21 | 0.011 |
| Coating liquid (17) for undercoat layer | — | — | — | $CH_3$ | $OCH_3$ | 0 | 0.050 | 0.21 | 0.011 |

[Production Example of Coating Liquid for Charge-Generating Layer]

<Coating Liquid (1) for Charge-Generating Layer>

A hydroxygallium phthalocyanine crystal (charge-generating substance) having a crystal form having peaks at Bragg angles (2θ±0.2°) of 7.5°, 9.9°, 12.5°, 16.3°, 18.6°, 25.1°, and 28.3° in CuKα characteristic X-ray diffraction was prepared. 10 Parts of the hydroxygallium phthalocyanine crystal, 5 parts of a polyvinylbutyral resin (product name: S-LEC BX-1, hydroxy value: 173 mgKOH/g, manufactured by Sekisui Chemical Co., Ltd.), and 260 parts of cyclohexanone were loaded into a vertical sand mill using glass beads each having a diameter of 1.0 mm, and were subjected to a dispersion treatment for 1.5 hours. Next, 240 parts of ethyl acetate was added to the resultant, to thereby prepare a coating liquid (1) for a charge-generating layer.

<Coating Liquid (2) for Charge-Generating Layer>

An oxytitanium phthalocyanine crystal (charge-generating substance) having a crystal form having peaks at Bragg angles (2θ±0.2°) of 9.5°, 9.7°, 15.0°, 24.1°, and 27.3° in CuKα characteristic X-ray diffraction was prepared. 1 Part of the oxytitanium phthalocyanine crystal, 1 part of a polyvinylbutyral resin (product name: S-LEC BX-1, hydroxy value: 173 mgKOH/g, manufactured by Sekisui Chemical Co., Ltd.), and 100 parts of tetrahydrofuran were subjected to a dispersion treatment with an ultrasonic disperser for 15 minutes, to thereby prepare a coating liquid (2) for a charge-generating layer.

[Production Example of Coating Liquid for Charge-Transporting Layer]

<Coating Liquid (1) for Charge-Transporting Layer>

10 Parts of an amine compound (charge-transporting substance) represented by the following formula (4) and 10 parts of a polyarylate resin having a structural unit represented by the following formula (5-1) and a structural unit represented by the following formula (5-2) in a ratio of 5/5 and having a weight-average molecular weight of 100,000 were dissolved in a mixed solvent of 30 parts of dimethoxymethane and 70 parts of chlorobenzene, to thereby prepare a coating liquid for a charge-transporting layer.

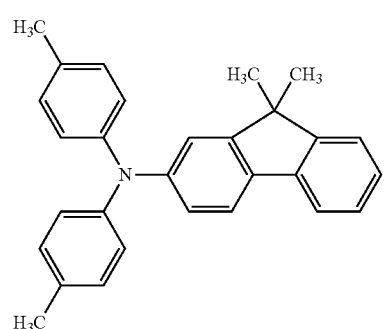

(4)

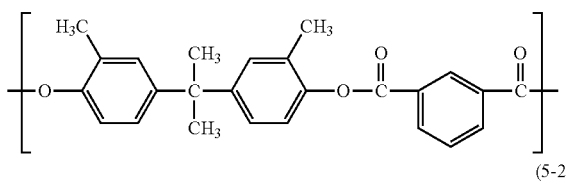

(5-1)

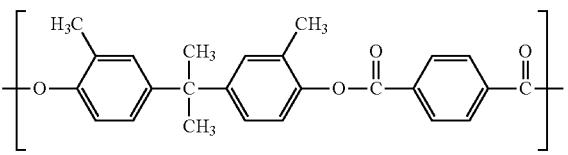

(5-2)

[Production Example of Electrophotographic Photosensitive Member]

<Electrophotographic Photosensitive Member (1)>

An aluminum cylinder (JIS H 4000:2006 A3003P, aluminum alloy) having a diameter of 20 mm and a length of 254.8 mm was subjected to cutting processing (JIS B 0601:2014, ten-point average roughness Rzjis: 0.8 μm), and the resultant was used as a support.

The coating liquid (1) for a conductive layer was applied onto the support by dip coating, and the obtained coat was dried at 140° C. for 30 minutes, to thereby form a conductive layer having a thickness of 30.1 μm.

Then, the coating liquid (1) for an undercoat layer was applied onto the conductive layer by dip coating, and the obtained coat was dried at 100° C. for 10 minutes. After that, the resultant was dried further for 10 minutes while the temperature was decreased from 100° C. to 95° C., to thereby form an undercoat layer having a thickness of 2.2 μm.

Then, the coating liquid (1) for a charge-generating layer was applied onto the undercoat layer by dip coating, and the obtained coat was dried at 100° C. for 10 minutes, to thereby form a charge-generating layer having a thickness of 0.27 μm.

Then, the coating liquid (1) for a charge-transporting layer was applied onto the charge-generating layer by dip coating, and the obtained coat was dried at 125° C. for 30 minutes, to thereby form a charge-transporting layer having a thickness of 22 μm.

As described above, an electrophotographic photosensitive member (1) including the conductive layer, the undercoat layer, the charge-generating layer, and the charge-transporting layer on the support was produced.

<Electrophotographic Photosensitive Members (2) to (15) and (18) to (21)>

Electrophotographic photosensitive members (2) to (15) and (18) were obtained by the same method as the production method for the electrophotographic photosensitive member (1) except that the configurations of the coating liquid for a conductive layer, the coating liquid for an undercoat layer, and the coating liquid for a charge-generating layer were changed as shown in Table 3.

<Electrophotographic Photosensitive Member (16)>

An aluminum cylinder (JIS H 4000:2006 A3003P, aluminum alloy) having a diameter of 20 mm and a length of 254.8 mm was subjected to cutting processing (JIS B 0601:2014, ten-point average roughness Rzjis: 0.8 μm), and the resultant was used as a support.

The coating liquid (1) for a conductive layer was applied onto the support by dip coating, and the obtained coat was dried at 140° C. for 30 minutes, to thereby form a conductive layer having a thickness of 30.1 μm.

Then, the coating liquid (3) for an undercoat layer was applied onto the conductive layer by dip coating, and the obtained coat was dried at 100° C. for 10 minutes, to thereby form an undercoat layer having a thickness of 2.1 μm.

Then, the coating liquid (1) for a charge-generating layer was applied onto the undercoat layer by dip coating, and the obtained coat was dried at 100° C. for 10 minutes, to thereby form a charge-generating layer having a thickness of 0.27 μm.

Then, the coating liquid (1) for a charge-transporting layer was applied onto the charge-generating layer by dip coating, and the obtained coat was dried at 125° C. for 30 minutes, to thereby form a charge-transporting layer having a thickness of 22 μm.

As described above, an electrophotographic photosensitive member (16) including the conductive layer, the undercoat layer, the charge-generating layer, and the charge-transporting layer on the support was produced.

<Electrophotographic Photosensitive Member (17)>

An electrophotographic photosensitive member (17) was obtained in the same manner as in the production of the electrophotographic photosensitive member (16) except that the configurations of the coating liquid for a conductive layer, the coating liquid for an undercoat layer, and the coating liquid for a charge-generating layer were changed as shown in Table 3, and the drying conditions of the charge-generating layer were changed to 80° C. for 7 minutes.

TABLE 3

| Electrophotographic photosensitive member | Conductive layer | Undercoat layer | Charge-generating layer | Charge-transporting layer |
|---|---|---|---|---|
| Electrophotographic photosensitive member (1) | Coating liquid (1) for conductive layer | Coating liquid (1) for undercoat layer | Coating liquid (1) for charge-generating layer | Coating liquid (1) for charge-transporting layer |
| Electrophotographic photosensitive member (2) | Coating liquid (1) for conductive layer | Coating liquid (2) for undercoat layer | Coating liquid (1) for charge-generating layer | Coating liquid (1) for charge-transporting layer |
| Electrophotographic photosensitive member (3) | Coating liquid (1) for conductive layer | Coating liquid (3) for undercoat layer | Coating liquid (1) for charge-generating layer | Coating liquid (1) for charge-transporting layer |
| Electrophotographic photosensitive member (4) | Coating liquid (1) for conductive layer | Coating liquid (4) for undercoat layer | Coating liquid (1) for charge-generating layer | Coating liquid (1) for charge-transporting layer |
| Electrophotographic photosensitive member (5) | Coating liquid (1) for conductive layer | Coating liquid (5) for undercoat layer | Coating liquid (1) for charge-generating layer | Coating liquid (1) for charge-transporting layer |
| Electrophotographic photosensitive member (6) | Coating liquid (1) for conductive layer | Coating liquid (6) for undercoat layer | Coating liquid (1) for charge-generating layer | Coating liquid (1) for charge-transporting layer |
| Electrophotographic photosensitive member (7) | Coating liquid (1) for conductive layer | Coating liquid (7) for undercoat layer | Coating liquid (1) for charge-generating layer | Coating liquid (1) for charge-transporting layer |
| Electrophotographic photosensitive member (8) | Coating liquid (1) for conductive layer | Coating liquid (8) for undercoat layer | Coating liquid (1) for charge-generating layer | Coating liquid (1) for charge-transporting layer |
| Electrophotographic photosensitive member (9) | Coating liquid (1) for conductive layer | Coating liquid (9) for undercoat layer | Coating liquid (1) for charge-generating layer | Coating liquid (1) for charge-transporting layer |
| Electrophotographic photosensitive member (10) | Coating liquid (1) for conductive layer | Coating liquid (10) for undercoat layer | Coating liquid (1) for charge-generating layer | Coating liquid (1) for charge-transporting layer |
| Electrophotographic photosensitive member (11) | Coating liquid (1) for conductive layer | Coating liquid (11) for undercoat layer | Coating liquid (2) for charge-generating layer | Coating liquid (1) for charge-transporting layer |
| Electrophotographic photosensitive member (12) | Coating liquid (1) for conductive layer | Coating liquid (12) for undercoat layer | Coating liquid (1) for charge-generating layer | Coating liquid (1) for charge-transporting layer |
| Electrophotographic photosensitive member (13) | Coating liquid (1) for conductive layer | Coating liquid (13) for undercoat layer | Coating liquid (1) for charge-generating layer | Coating liquid (1) for charge-transporting layer |
| Electrophotographic photosensitive member (14) | Coating liquid (1) for conductive layer | Coating liquid (14) for undercoat layer | Coating liquid (1) for charge-generating layer | Coating liquid (1) for charge-transporting layer |
| Electrophotographic photosensitive member (15) | Coating liquid (2) for conductive layer | Coating liquid (3) for undercoat layer | Coating liquid (1) for charge-generating layer | Coating liquid (1) for charge-transporting layer |
| Electrophotographic photosensitive member (16) | Coating liquid (1) for conductive layer | Coating liquid (3) for undercoat layer | Coating liquid (1) for charge-generating layer | Coating liquid (1) for charge-transporting layer |
| Electrophotographic photosensitive member (17) | Coating liquid (1) for conductive layer | Coating liquid (15) for undercoat layer | Coating liquid (1) for charge-generating layer | Coating liquid (1) for charge-transporting layer |
| Electrophotographic photosensitive member (18) | Coating liquid (1) for conductive layer | Coating liquid (16) for undercoat layer | Coating liquid (1) for charge-generating layer | Coating liquid (1) for charge-transporting layer |

TABLE 3-continued

| Electrophotographic photosensitive member | Conductive layer | Undercoat layer | Charge-generating layer | Charge-transporting layer |
|---|---|---|---|---|
| Electrophotographic photosensitive member (19) | Coating liquid (1) for conductive layer | Coating liquid (17) for undercoat layer | Coating liquid (1) for charge-generating layer | Coating liquid (1) for charge-transporting layer |
| Electrophotographic photosensitive member (20) | Coating liquid (1) for conductive layer | Coating liquid (18) for undercoat layer | Coating liquid (1) for charge-generating layer | Coating liquid (1) for charge-transporting layer |
| Electrophotographic photosensitive member (21) | Coating liquid (1) for conductive layer | Coating liquid (19) for undercoat layer | Coating liquid (1) for charge-generating layer | Coating liquid (1) for charge-transporting layer |

(Measurement of Content of Compound Represented by Formula (1) in Undercoat Layer)

The charge-transporting layer and the charge-generating layer were wiped away from the surface of the produced electrophotographic photosensitive member through use of waste cloth (for example, Kimwipes (trademark), manufactured by Kimberly-Clark Professional) impregnated with an ester-based solvent (for example, ethyl acetate, manufactured by The Nippon Synthetic Chemical Industry Co., Ltd.). After that, the resultant was dried at 100° C. for 30 minutes, to thereby obtain an electrophotographic photosensitive member having the undercoat layer exposed therefrom.

The electrophotographic photosensitive member was cooled to normal temperature, and then the surface of the electrophotographic photosensitive member having the undercoat layer exposed therefrom was scraped through use of a spatula, to thereby recover 500 mg of the undercoat layer.

The content was measured through use of a head space-gas chromatograph/mass spectrometer (HS-GC/MS). The measurement was performed through use of TurboMetrix 40 manufactured by PerkinElmer Co., Ltd. as the head space, and ThermoFisher (TRACE GU ULTRA, ISQ) manufactured by Thermo Fisher Scientific as the gas chromatograph/mass spectrometer.

(Creation of Calibration Curve)

Methyl ethyl ketone (manufactured by Kishida Chemical Co., Ltd.) was weighed in amounts of 0.005 mg, 0.025 mg, and 0.05 mg into 20 ml glass vials manufactured by PerkinElmer Co., Ltd., to thereby produce three kinds of samples. Each of the samples was measured under the following measurement conditions to obtain a chromatograph. The obtained peak was identified through use of analysis software included in ThermoFisher (TRACE GU ULTRA, ISQ) and confirmed to be a peak of the same compound as that represented by the Formula (1). A calibration curve was created through use of the peak area thereof.

(Measurement Conditions)

Injection port temperature: 200° C.
Flow mode: constant pressure (150 kPa)
Temperature increase conditions: after kept at 40° C. for 3 minutes, increased at 2° C./min to 70° C., increased at 5° C./min to 150° C., and increased at 10° C./min to 300° C.

(Measurement of Sample)

500 mg of the recovered undercoat layer was minutely ground and introduced into a bottom surface of a 20 ml glass vial manufactured by PerkinElmer Co., Ltd. so as to be uniform. The glass vial was sealed with a lid manufactured by PerkinElmer Co., Ltd. The glass vial was set in a measurement apparatus and kept at 150° C. for 1 hour. After that, a volatile component of the sample was transferred to the GC/MS through use of an autosampler.

After that, analysis by the GC/MS was performed under the above-mentioned conditions.

The obtained peak was identified through use of analysis software included in ThermoFisher (TRACE GU ULTRA, ISQ).

It was confirmed that the probability at which the obtained peak was assumed to be a peak of the same compound as that represented by the Formula (1) was 99% or more. After that, the content of the compound contained in 500 mg of the undercoat layer was quantified from the calibration curve created in advance. The content of each of the other compounds represented by the Formula (1) in the undercoat layer was also quantified by the same procedure. The results of the electrophotographic photosensitive members are shown in Table 4.

(Evaluation of Potential and Fluctuation in Potential Under High-Temperature and High-Humidity Environment)

The electrophotographic photosensitive member produced as described above was mounted to a process cartridge (manufactured by Hewlett-Packard Company) for HP Color LaserJet ProM452dn, and the process cartridge was reconstructed so that a potential probe (product name: model 6000B-8, manufactured by Trek Japan KK) was installed at a development position. After that, the potential of a center portion (position of about 127 mm) of the electrophotographic photosensitive member was measured through use of a surface potentiometer (product name: model 344, manufactured by Trek Japan KK). The light amount of image exposure was set so that, in the surface potential of the electrophotographic photosensitive member, an initial dark portion potential ($Vd_0$) was −650 V, and an initial light portion potential ($Vl_0$) was about −85 V under an environment having a temperature of 30° C. and a humidity of 80% RH. In an exposure amount set in this state (state in which the potential probe was present in a portion of a developing machine), image formation of an image having a printing rate of 2% on plain paper of an A4 size was performed on 38,000 sheets in an intermittent mode in which printing was suspended every time two sheets of the images were formed under an environment having a temperature of 30° C. and a humidity of 80% RH, and a light portion potential ($Vl_f$) after repeated use was measured. A potential fluctuation of the light portion potential $\Delta Vl = Vl_f - Vl_0$ (unit: V) is shown in Table 4.

(Evaluation of Image Density)

The electrophotographic photosensitive member was mounted to a process cartridge (manufactured by Hewlett-Packard Company) for HP Color LaserJet ProM452dn, and the light amount of image exposure was set so that an initial dark portion potential ($Vd_0$) was constantly −650 V and an initial light portion potential ($Vl_0$) was constantly about −85V In this state, a chart having a solid image portion formed on entire printing paper was output on one sheet before and after the above-mentioned repeated use. The solid image was measured with a reflection densitometer through use of an SPI filter in a Macbeth densitometer (manufactured by Macbeth). Evaluation was performed from two viewpoints of the initial reflection density and the difference in density before and after long-term use.

When the initial reflection density was 1.30 or more as the measured Macbeth density, an image had no problem in actual use. In addition, the difference in density of the solid image on the chart sheet before and after long-term use under a high-temperature and high-humidity environment was confirmed. When the difference in density was less than 0.25 in long-term use, an image had no problem in actual use. Meanwhile, when the difference in density was 0.25 or more, an image had a problem in actual use.

Comparison to fluctuation in light portion potential was confirmed. When ΔVl was less than 60 V, an image with a density having no problem in long-term actual use under a high-temperature and high-humidity environment was obtained. When ΔVl was 60 V or more, an image having a problem in actual use was obtained.

EXAMPLES

Example 1

The results of the evaluation under a high-temperature and high-humidity environment through use of the electrophotographic photosensitive member (1) are shown in Table 4. $Vl_0$ was 85 V, and ΔVl was 25 V In addition, as a result of measuring the content of the compound represented by the Formula (1) in the undercoat layer, the content was 20 ppm. The results are shown in Table 4.

When the electrophotographic photosensitive member (1) was used, the potential stability in long-term use under a high-temperature and high-humidity environment was improved, and satisfactory image quality, in which degradation in image quality, such as a low density, was not observed, was obtained.

Examples 2 to 18

The evaluation was performed in the same manner as in Example 1 except that the electrophotographic photosensitive member was replaced by each of electrophotographic photosensitive members shown in Table 4 in the evaluation procedure in Example 1, and the results of the evaluation are shown in Table 4. In each of Examples 2 to 18, as in Example 1, the potential stability in long-term use under a high-temperature and high-humidity environment was improved, and an image with a density having no problem in actual use was obtained.

Comparative Examples 1 to 3

The evaluation was performed in the same manner as in Example 1 except that the electrophotographic photosensitive member was replaced by each of electrophotographic photosensitive members shown in Table 4 in the evaluation procedure in Example 1, and the results of the evaluation are shown in Table 4. In any of the electrophotographic photosensitive members of Comparative Examples 1 to 3, fluctuation in potential in long-term use under a high-temperature and high-humidity environment was large, and an image with a density having a problem in long-term actual use was obtained.

TABLE 4

| Example No. | Electrophotographic photosensitive member No. | Content (ppm) of compound represented by Formula (1) in undercoat layer | $Vl_0$ | $Vl_f$ | ΔVl |
| --- | --- | --- | --- | --- | --- |
| Example 1 | Electrophotographic photosensitive member (1) | 20 | 85 | 110 | 25 |
| Example 2 | Electrophotographic photosensitive member (2) | 20 | 85 | 108 | 23 |
| Example 3 | Electrophotographic photosensitive member (3) | 20 | 85 | 109 | 24 |
| Example 4 | Electrophotographic photosensitive member (4) | 5 | 86 | 125 | 39 |
| Example 5 | Electrophotographic photosensitive member (5) | 77 | 85 | 126 | 41 |
| Example 6 | Electrophotographic photosensitive member (6) | 20 | 86 | 124 | 38 |
| Example 7 | Electrophotographic photosensitive member (7) | 20 | 86 | 112 | 26 |
| Example 8 | Electrophotographic photosensitive member (8) | 20 | 93 | 130 | 37 |
| Example 9 | Electrophotographic photosensitive member (9) | 20 | 86 | 136 | 50 |
| Example 10 | Electrophotographic photosensitive member (10) | 20 | 85 | 109 | 24 |
| Example 11 | Electrophotographic photosensitive member (11) | 20 | 92 | 123 | 31 |
| Example 12 | Electrophotographic photosensitive member (12) | 20 | 84 | 111 | 27 |
| Example 13 | Electrophotographic photosensitive member (13) | 20 | 85 | 123 | 38 |
| Example 14 | Electrophotographic photosensitive member (14) | 20 | 86 | 138 | 52 |
| Example 15 | Electrophotographic photosensitive member (15) | 20 | 85 | 101 | 16 |
| Example 16 | Electrophotographic photosensitive member (16) | 17 | 85 | 100 | 15 |
| Example 17 | Electrophotographic photosensitive member (20) | 20 | 85 | 122 | 37 |
| Example 18 | Electrophotographic photosensitive member (21) | 20 | 85 | 121 | 36 |

TABLE 4-continued

| Example No. | Electrophotographic photosensitive member No. | Content (ppm) of compound represented by Formula (1) in undercoat layer | Vl$_0$ | Vl$_f$ | ΔVl |
|---|---|---|---|---|---|
| Comparative Example 1 | Electrophotographic photosensitive member (17) | 88 | 85 | 147 | 62 |
| Comparative Example 2 | Electrophotographic photosensitive member (18) | 20 | 85 | 162 | 77 |
| Comparative Example 3 | Electrophotographic photosensitive member (19) | — | 85 | 180 | 95 |

As described by way of the aspects and Examples, the electrophotographic photosensitive member of the present disclosure that is improved in potential stability in long-term use under a high-temperature and high-humidity environment, and that does not cause degradation in image quality, such as a low density, can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-224140, filed Nov. 29, 2018, which is hereby incorporated by reference herein in its entirety.

What is claimed is:

1. An electrophotographic photosensitive member comprising:
   a support;
   an undercoat layer formed on the support;
   a charge-generating layer formed directly on the undercoat layer; and
   a charge-transporting layer formed on the charge-generating layer,
   wherein the undercoat layer contains a polyamide resin, titanium oxide particles surface-treated with an organic silicon compound, and a compound represented by the following Formula (1), and
   wherein the undercoat layer has a content of the compound represented by the Formula (1) of 4 ppm or more and 80 ppm or less:

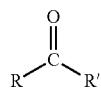

Formula (1)

in the Formula (1), R and R' each independently represent a methyl group or an ethyl group.

2. The electrophotographic photosensitive member according to claim 1, wherein the charge-generating layer contains a hydroxygallium phthalocyanine crystal.

3. The electrophotographic photosensitive member according to claim 1, wherein the electrophotographic photosensitive member satisfies the following Expression (a):

0.010≤a×b≤0.040    Expression (a)

where "a" represents an average primary particle diameter [μm] of the titanium oxide particles surface-treated with the organic silicon compound, and "b" represents a mass ratio [wt %] of a Si element to a Ti element contained in the titanium oxide particles surface-treated with the organic silicon compound.

4. The electrophotographic photosensitive member according to claim 3, wherein the average primary particle diameter "a" [μm] of the titanium oxide particles surface-treated with the organic silicon compound is 0.015 μm or more and 0.070 μm or less.

5. The electrophotographic photosensitive member according to claim 1, wherein the organic silicon compound comprises a compound represented by the following Formula (2):

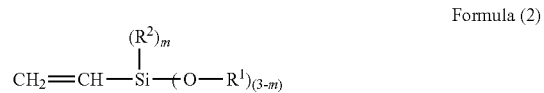

Formula (2)

in the Formula (2), R$^1$ is selected from the group consisting of an alkyl group, an alkylcarbonyl group, and an alkoxyalkyl group, R$^2$ represents a hydrogen atom or an alkyl group, and "m" represents an integer of from 0 to 3.

6. The electrophotographic photosensitive member according to claim 1, wherein the organic silicon compound comprises at least one kind selected from the group consisting of vinyltrimethoxysilane, vinyltriethoxysilane, and vinylmethyldimethoxysilane.

7. An electrophotographic apparatus comprising:
   the electrophotographic photosensitive member of claim 1;
   a charging unit;
   an exposing unit;
   a developing unit; and
   a transferring unit,
   wherein the electrophotographic photosensitive member comprises: a support; an undercoat layer formed on the support; a charge-generating layer formed directly on the undercoat layer; and a charge-transporting layer formed on the charge-generating layer,
   wherein the undercoat layer contains a polyamide resin, titanium oxide particles surface-treated with an organic silicon compound, and a compound represented by the following Formula (1), and
   wherein the undercoat layer has a content of the compound represented by the Formula (1) of 4 ppm or more and 80 ppm or less:

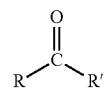

Formula (1)

in the Formula (1), R and R' each independently represent a methyl group or an ethyl group.

8. A process cartridge comprising:
the electrophotographic photosensitive member of claim 1; and
at least one unit selected from the group consisting of a charging unit, a developing unit, and a cleaning unit,
the process cartridge integrally supporting the electrophotographic photosensitive member and the at least one unit, and being removably mounted to a main body of an electrophotographic apparatus,
wherein the electrophotographic photosensitive member comprises: a support; an undercoat layer formed on the support; a charge-generating layer formed directly on the undercoat layer; and a charge-transporting layer formed on the charge-generating layer,
wherein the undercoat layer contains a polyamide resin, titanium oxide particles surface-treated with an organic silicon compound, and a compound represented by the following Formula (1), and
wherein the undercoat layer has a content of the compound represented by the Formula (1) of 4 ppm or more and 80 ppm or less:

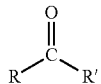

Formula (1)

in the Formula (1), R and R' each independently represent a methyl group or an ethyl group.

* * * * *